United States Patent [19]

Atchison et al.

[11] Patent Number: 5,127,605
[45] Date of Patent: Jul. 7, 1992

[54] CONTROL SURFACE STRUCTURES FOR FLUID-BORNE VEHICLES AND METHOD FOR ROTATIONALLY MOVING SUCH STRUCTURES

[75] Inventors: Donald L. Atchison, Gilbert; Marshall U. Hines, Scottsdale; Larry K. Ball, Chandler, all of Ariz.

[73] Assignee: Allied-Signal Inc., Morris Township, Morris County, N.J.

[21] Appl. No.: 690,030

[22] Filed: Apr. 23, 1991

[51] Int. Cl.⁵ .................. F42B 10/64; F42B 19/04; B64C 3/54
[52] U.S. Cl. .................. 244/3.27; 244/326; 244/42; 244/218; 114/332
[58] Field of Search .................. 244/3.24, 3.26, 3.27, 244/3.3, 46, 218, 82; 114/332, 126

[56] References Cited

U.S. PATENT DOCUMENTS

| | | | |
|---|---|---|---|
| 1,681,642 | 8/1928 | Kennedy | 244/218 |
| 4,460,138 | 7/1984 | Sankrithi | 244/218 |
| 4,667,899 | 5/1987 | Wedertz | 244/218 |
| 4,964,431 | 10/1990 | Ball et al. | 137/1 |
| 5,040,746 | 8/1991 | Mikhail | 244/3.27 |

FOREIGN PATENT DOCUMENTS 0412315 12/1938 Fed. Rep. of Germany ...... 244/218

Primary Examiner—Michael J. Carone
Attorney, Agent, or Firm—Joseph R. Black; Terry L. Miller; James W. McFarland

[57] ABSTRACT

A fluidfoil (78) for use in guiding fluid-borne vehicles has first and second bodies (82, 80) arranged in telescoping relation and collectively defining the leading and trailing edges (18, 20) of the fluidfoil so that the chord length (24) of the fluidfoil is variable. The bodies (82, 80) are rotatable about a shaft (16) defining an axis (14) in fixed positional relation to the leading edge (18), and the fluidfoil (78) is operable under the influence of a relatively moving, surrounding fluid medium (22) to assume an angle of attack which depends on chord length (24).

8 Claims, 3 Drawing Sheets

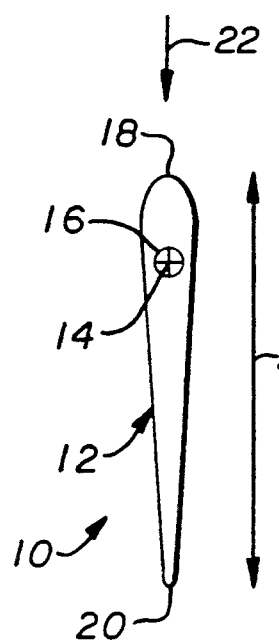
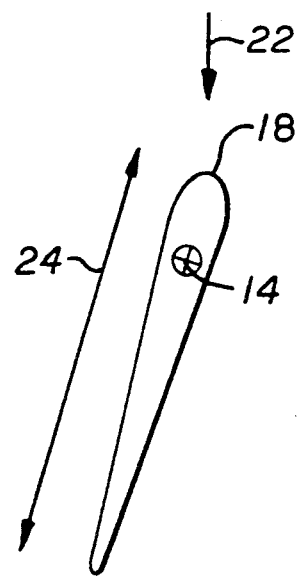
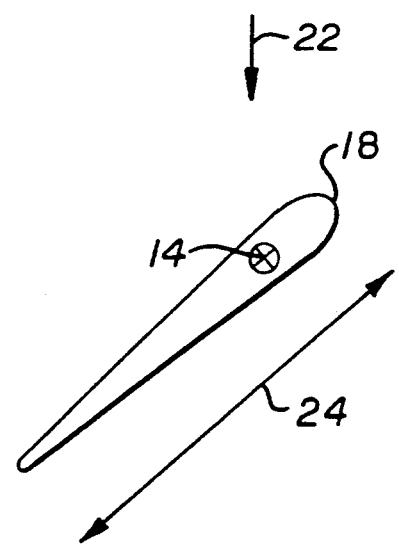
FIG. 1A      FIG. 1B      FIG. 1C
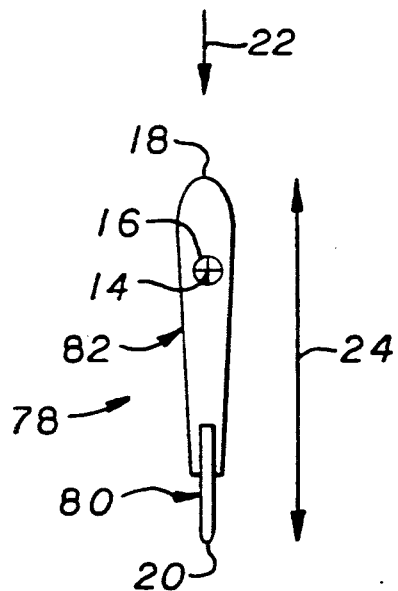
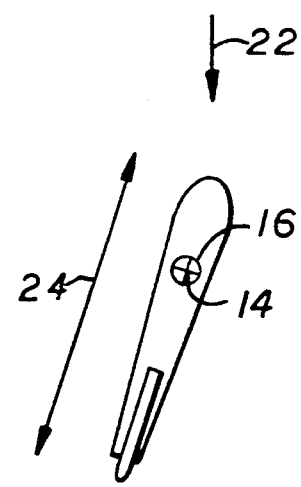
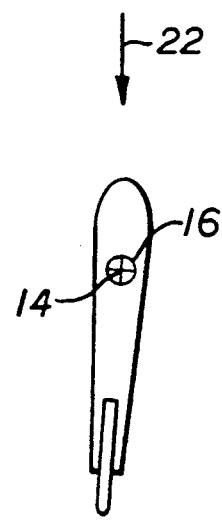
FIG. 5A      FIG. 5B      FIG. 5C FIG. 2
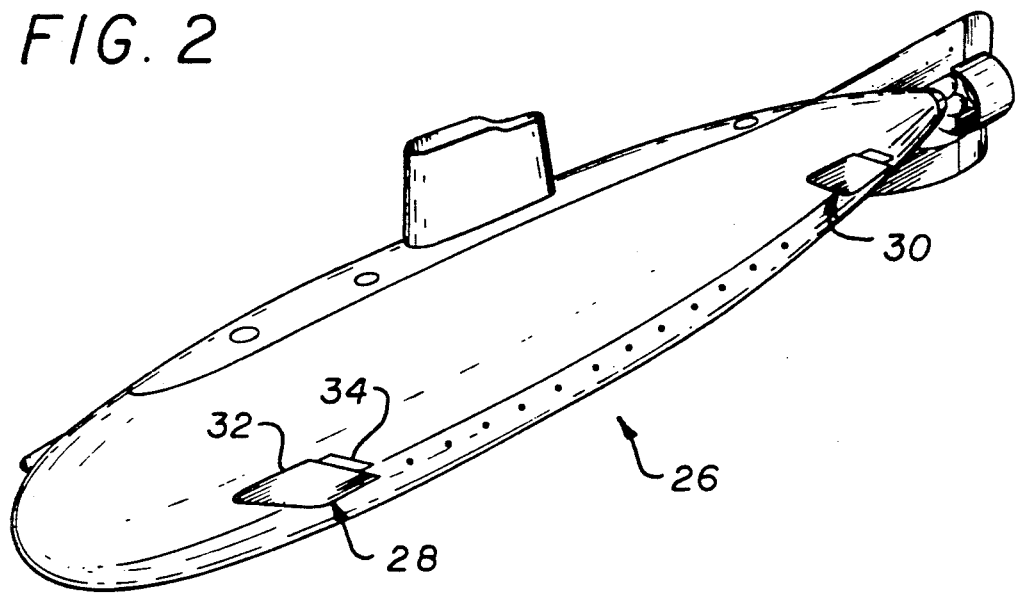
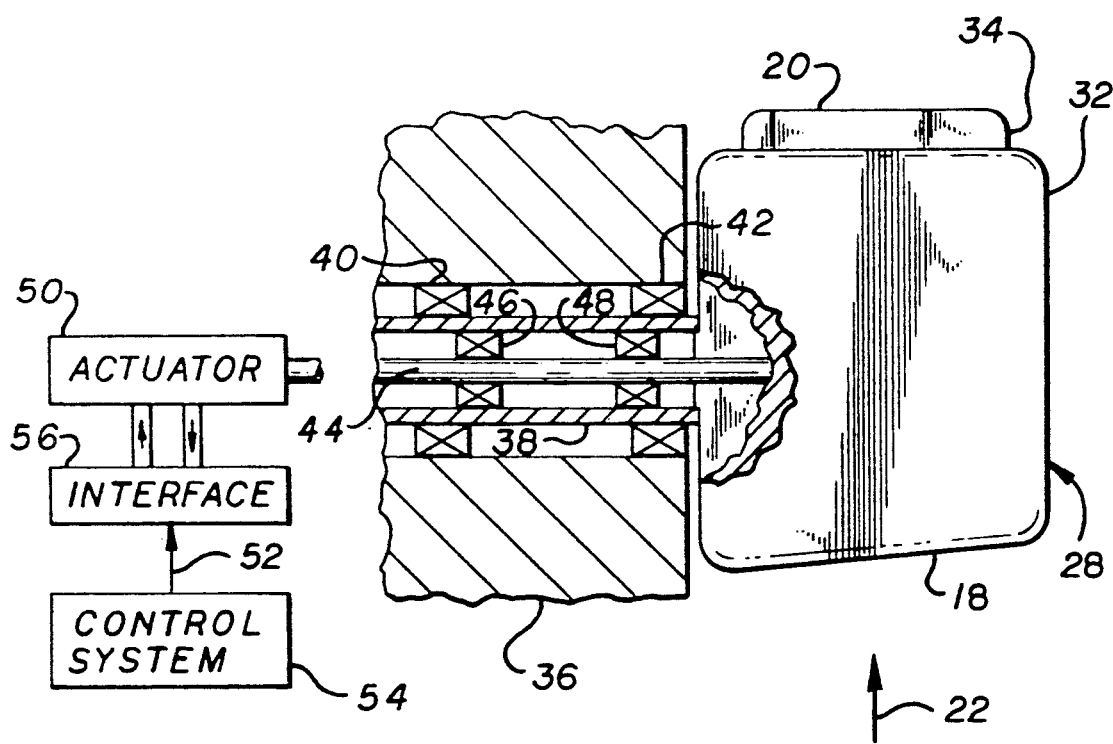
FIG. 3

CONTROL SURFACE STRUCTURES FOR FLUID-BORNE VEHICLES AND METHOD FOR ROTATIONALLY MOVING SUCH STRUCTURES

The present invention relates generally to control surface structures such as airfoils, hydrofoils, and fins. More specifically, the invention pertains to such structures that achieve a guidance function by rotational movement of the entire structure about a fixed axis, and to related methods for moving such structures.

BACKGROUND OF THE INVENTION

Actuation of control surface structures such as canards, dive planes, rudders, and torpedo and missile fins requires considerable force because of the torque exerted by the surrounding fluid about the fixed axis of rotation of the structure. Accordingly, the actuation system for the related air or water vehicle must be sized to provide the power required to rotate and hold the control surface structure against the aerodynamic or hydrodynamic torque acting thereon. This in turn affects the weight carried by the related vehicle, the volume thereof occupied by the actuation system, and the noise generated by the actuators. These physical characteristics are of particular importance in submarine vessels. Actuation system requirements for dive planes and rudders may add several tons to the weight of a submarine, and the noise produced during operation of the actuators may be detectable. The weight carried by a missile or torpedo can affect speed and range, and reduction in both weight and volume are on-going goals in the design of aircraft components.

An objective of the present invention is to provide a control surface structure for air or water vehicles that will enable a significant reduction in the power output required from an operatively associated actuator.

SUMMARY OF THE INVENTION

The invention accomplishes the above-stated objective by providing a vehicle adapted for propulsion in a fluid medium and comprising in combination: a projecting control surface structure secured to the vehicle; the structure comprising a first streamlined body generally oriented along a direction associated with said propulsion, and a second similarly oriented body connected in male telescoping relation to the first; the first body forming a leading edge and the second body forming a trailing edge of the structure with respect to flow of said medium past the structure; and a shaft defining a longitudinal axis thereof and intersecuring the structure with the vehicle the shaft supporting the structure such that the structure is rotationally movable about the axis; the shaft and structure being intersecured with the vehicle such that the structure is operative during said propulsion to move rotationally about the axis and relative to the vehicle in response to retractile movement of the second body into the first.

The method of the invention is a method for changing the angle of attack of a fluidfoil which has leading and trailing edges defining a chord extending therebetween. The method comprises the steps of: first, effecting relative movement between the fluidfoil and a surrounding fluid medium such that the direction of fluid flow past the fluidfoil is from the leading edge to the trailing edge, whereby the fluidfoil reacts by assuming a first angle of attack with respect to the direction of flow; and, second, moving the trailing edge closer to the leading edge to decrease the length of the chord, whereby the fluidfoil reacts by assuming a second angle of attack different from the first angle of attack.

Essentially, the invention provides its considerable advantage by making use of the pressure exerted by fluid on the fluidfoil rather than working against that pressure in the conventional manner.

BRIEF DESCRIPTION OF THE DRAWINGS

FIGS. 1(a)–1(c) schematically illustrate the principle embodied in the invention.

FIG. 2 is a perspective view of a submarine having dive planes which embody the invention.

FIG. 3 is a partially elevational, partially cross-sectional, and partially diagrammatic view illustrating support and actuation of the dive planes shown in FIG. 2.

FIGS. 5(a)–5(c) are schematic views employed to aid description of the inventive method.

DESCRIPTION OF THE PREFERRED EMBODIMENT

Figure 4A:
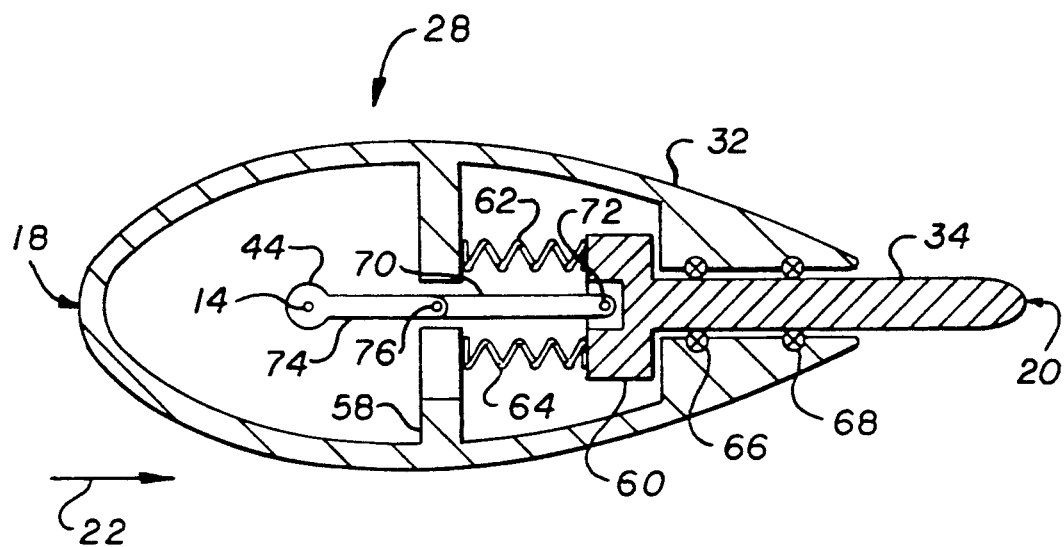
FIGS. 4(a) and 4(b) are cross-sectional views of a purely mechanical embodiment of the inventive fluidfoil apparatus.

FIGS. 1(a)–1(c) of the drawings schematically illustrate the principle of the invention. A fluidfoil 10 (hereinafter, "foil"—the word fluidfoil is used herein as a combinational term that includes both airfoils and hydrofoils) forming a control surface 12 of an air vehicle or water vehicle is rotatable about the longitudinal axis 14 of a shaft 16 or other member in pivotally supporting relation to the foil. The foil 10 forms a leading edge 18 and a trailing edge 20 with respect to relative motion between the foil and a surrounding fluid, the latter being represented in the drawings by the arrow 22. The leading and trailing edges 18, 20 define a chord extending therebetween and having a fixed length 24. The shaft 16 is secured to the foil 10 so as to be movable relative to the center of the chord in a direction substantially parallel to the latter. The three figures illustrate that the angle of attack of the foil 10 moves in response to changes in the position of the shaft 16.

Reference is now made to FIGS. 2 and 3 which illustrate a submarine 26 having forward and aft dive planes 28, 30 incorporating the principle of the invention in modified form. Each dive plane (as at 28) comprises a first streamlined body 32 forming the leading edge 18 and a second body 34 extending aft of the first body and forming the trailing edge 20. The second body 34 is variably retractable into the first body 32 in order to variably change the chord length 24 (FIG. 1).

Returning briefly to FIG. 1, it can be seen that if the supporting shaft 16 (FIG. 1) is held in constant linear position relative to the leading edge 18, a change in the position of the trailing edge 20 effectively changes the position of the axis 14 (FIG. 1) relative to the center of the chord.

Referring now to FIG. 3, a structural member 36 of the submarine 26 is shown in supporting relation to the dive plane 28. The first body 32 is rigidly secured to a hollow shaft 38 which defines the axis 14. The hollow shaft 38 is journalled and rotatable in the structural member 36 via bearings 40, 42. Suitable means (not shown) are employed to prevent axial movement of the hollow shaft 38 and to limit rotational movement thereof. A center shaft 44 coaxial with the hollow shaft 38 is nested in the latter and freely rotatable with respect thereto via bearings 46, 48. As is further described below, rotation of the center shaft 44 retracts the second body 34 into the first body 32. Rotational movement of the center shaft 44 is effected by a conventional actuator 50 in response to electronic signals 52 communicated from a control system 54 to an interface 56 operatively associated with the actuator. Although the actuator 50 may be of a conventional type, its overall size, weight, and required power output may be considerably reduced by use of the present invention.

Figure 4B:
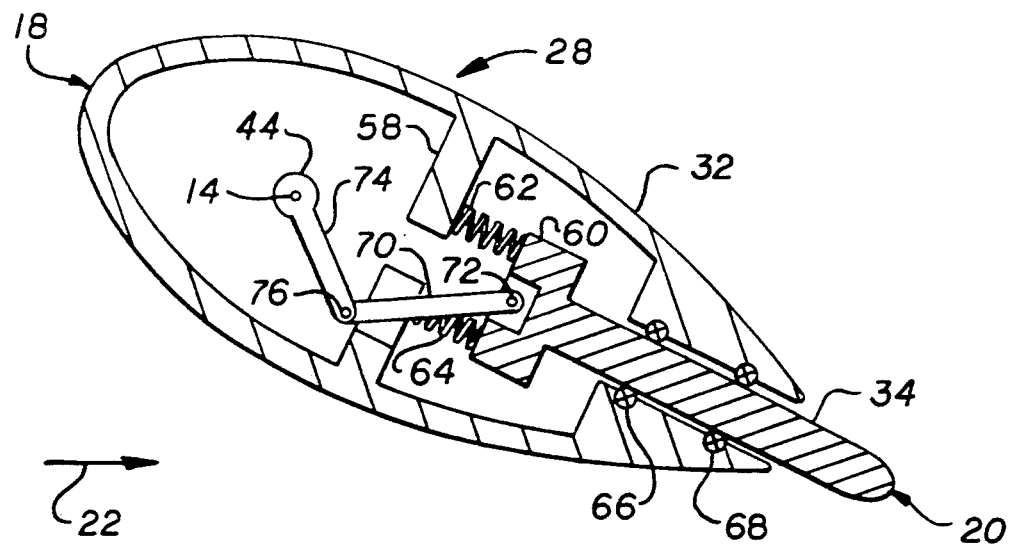

Referring now to FIGS. 4(a) and 4(b), the second body 34 is essentially an extensible flap member projecting outwardly from the first body 32. The first and second bodies 32, 34 are provided with bosses 58, 60 in which four compression springs are seated, only two of the springs 62, 64 being illustrated in the drawings. Bearings 66, 68 fix the relative rotational positions of the first and second bodies while permitting free movement of the second body relative to the first in a direction substantially parallel to the chord. A pivot arm 70 is secured near one end to the second body 34 via a pin 72 and is freely rotatable about the pin. The pivot arm 70 is secured near an opposite end to a crank arm 74 via a pin 76 and is also freely rotatable about the latter. The crank arm 74 is rigidly secured to the center shaft 44 as indicated. In FIG. 4(a), the second body 34 is shown in the fully extended position limited by the pivot arm 70 and crank arm 74. The second body 34 is biased toward said position by the compression springs 62, 64. Upon rotation of the center shaft 44 and crank arm 74 in a clockwise direction as viewed in the drawing, the second body 34 is retracted into the first body 32 as shown in FIG. 4(b).

In accord with the above, the method of the invention can be described as follows with reference to FIGS. 5(a)-5(c). A fluidfoil 78 forming a leading edge 18 and a trailing edge 20 and having a chord length 24 which is variable by retraction of a second body 80 into a first 82 is rotatable about an axis 14 which is defined by a shaft 16 in fixed position relative to the leading edge. The foil 78 is moved through a surrounding fluid medium 22 (or the fluid is moved past the foil while the shaft 16 is held in fixed position) while maintaining a fixed shape and chord length 24, whereby the foil reacts by rotating about the axis 14 and assuming a first angle of attack, as is indicated in FIG. 5(a). While continuing the relative motion between the foil 78 and the fluid 22, the foil is altered by retracting the second body 80 int the first body 82 to decrease the chord length 24, and the fluid 22 responsively acts upon the altered foil such that the latter reacts by rotating about the axis 14 and assuming a second angle of attack, as is indicated in FIG. 5(b). Reversal of the foregoing change in angle of attack is illustrated by FIG. 5(c), wherein the foil 78 assumes a third angle of attack near the first in response to extension of the second body 80 such that the chord length 24 is again changed to a length near that indicated in FIG. 5(a).

It should be recognized that the particular mechanism used for retracting the second body 34 as illustrated in FIGS. 4(a) and 4(b) is unnecessary for practicing the invention, and that in the application illustrated in FIG. 2, that mechanism may even be undesirable. Since noise reduction is particularly important in such an application, the center shaft 44, crank arm 74, pivot arm 72, and springs 62, 64 may be replaced with a functionally equivalent hydraulic system. In an application such as a fin on a guided missile, it is likely that a functionally equivalent hydraulic/fluidic system would be preferable. Mechanisms as simple as that illustrated in FIGS. 4(a) and 4(b) are more likely suitable for applications such as rudders for common watercraft.

Accordingly, the foregoing portion of the description, which description includes the accompanying drawings, is not intended to restrict the scope of the invention to the illustrated embodiment thereof or to specific details ancillary to the teaching contained herein. The invention should be construed in accord with the following claims and their equivalents.

What is claimed is:

1. A vehicle adapted for propulsion in a fluid medium and comprising in combination:
    a projecting control surface structure secured to the vehicle; the structure comprising a first streamlined body generally oriented along a direction associated with said propulsion, and a second similarly oriented body connected in male telescoping relation to the first; the first body forming a leading edge and the second body forming a trailing edge of the structure with respect to flow of said medium past the structure; and
    a shaft defining a longitudinal axis thereof and intersecuring the structure with the vehicle, the shaft supporting the structure such that the structure is rotationally movable about the axis;
    the shaft and structure being intersecured with the vehicle such that the structure is operative during said propulsion to move rotationally about the axis and relative to the vehicle in response to retractile movement of the second body into the first.

2. A vehicle as recited in claim 1 wherein the shaft is rotationally movable relative to the vehicle and is rigidly secured to the control surface structure.

3. A vehicle as recited in claim 2 further comprising a second shaft coaxial with the shaft and intersecured with the vehicle and structure such that the second shaft is rotationally movable relative to both, the structure being operable to effect said retractile movement in response to rotational movement of the second shaft about the axis.

4. The invention of claim 3 wherein the shaft is connected to the structure such that the axis is in fixed positional relation to the leading edge.

5. A vehicle as recited in claim 3 wherein the shaft is a hollow shaft and the second shaft is nested therein.

6. A vehicle as recited in claim 3 further comprising mechanical means for effecting said retractile movement in response to said rotational movement of the second shaft.

7. A method for changing the angle of attack of a fluidfoil which has leading and trailing edges defining a chord extending from the leading edge to the trailing edge and is rotatable about an axis defined by a shaft, comprising the steps of:
    first, effecting relative movement between the fluidfoil and a surrounding fluid medium such that the direction of fluid flow past the fluidfoil is from the leading edge to the trailing edge, whereby the fluidfoil reacts by rotationally moving about the axis and assuming a first angle of attack; and
    second, while continuing the relative movement, altering the fluidfoil by moving the trailing edge in a direction approximately parallel to the chord and toward the leading edge, whereby the fluidfoil reacts by rotationally moving about the axis and assuming a second angle of attack different from the first.

8. A method as recited in claim 7 comprising the further step of: third, while continuing the relative movement, again altering the fluidfoil by moving the trailing edge in a direction approximately parallel to the chord and away from the leading edge, whereby the fluidfoil reacts by rotationally moving about the axis and assuming a third angle of attack nearer the first.

* * * * *